Dec. 8, 1964  G. J. MARTIN  3,160,076
FLUID SYSTEM AND RELIEF VALVE ASSEMBLY THEREFOR
Filed Dec. 14, 1961  2 Sheets-Sheet 1

INVENTOR.
GEORGE J. MARTIN
BY
Oberlin, Maky & Donnelly
ATTORNEYS

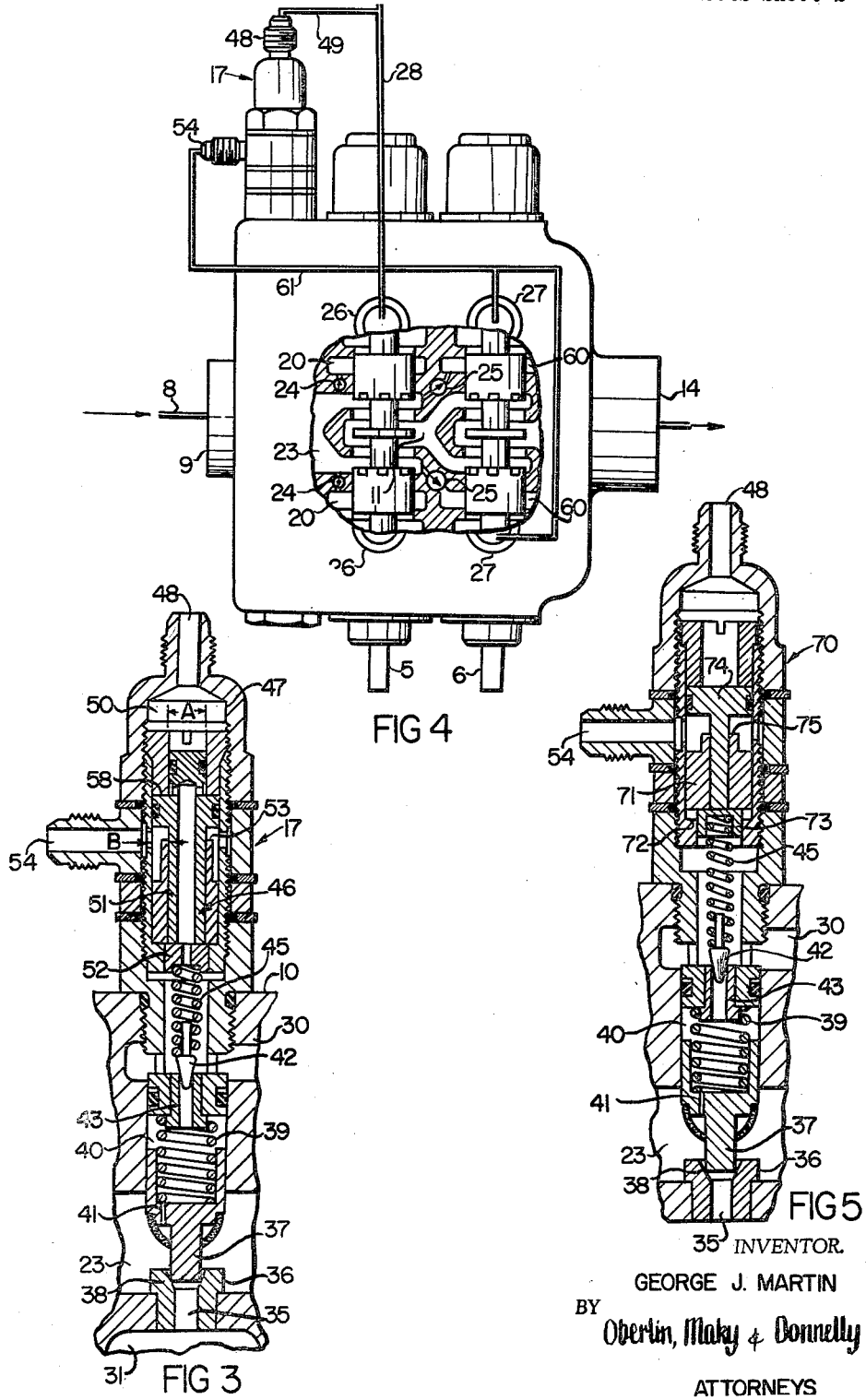

United States Patent Office

3,160,076
Patented Dec. 8, 1964

3,160,076
FLUID SYSTEM AND RELIEF VALVE ASSEMBLY
THEREFOR
George J. Martin, Lyndhurst, Ohio, assignor to Parker-Hannifin Corporation, Cleveland, Ohio, a corporation of Ohio
Filed Dec. 14, 1961, Ser. No. 159,413
16 Claims. (Cl. 91—414)

The present invention relates generally as indicated to a fluid system and relief valve assembly therefor and more particularly to a fluid system that comprises a pump, a reservoir, a plurality of fluid motors, a plurality of directional control valves for said motors, and a unitary relief valve assembly that has different relief pressures according to which one of said control valves is actuated.

In many fluid systems such as those associated with front end loaders, bulldozers, and like equipment, it is desired to have available a higher than normal operating pressure to effect bucket or blade roll-back whereas normal operating pressure is adequate to effect bucket or blade tilt in the opposite direction and to effect the boom-hoist and boom-lower operations. It is therefore evident that the operation of the system at a pressure no greater than the normal maximum, except for the bucket or blade roll-back operation, effects economy of operation of the system and minimizes heating of the oil and wear and tear on the pump, the directional control valves, the fluid motor packings, and other components of the system.

Accordingly, it is a principal object of this invention to provide a fluid system and relief valve assembly therefor in which one motor port of a directional control valve, when communicated with the pressure inlet port of said valve, will permit conduction of higher than normal pressure to the associated fluid motor, and in which the other motor port, when communicated with said inlet port, will permit conduction of only the normal pressure to the associated fluid motor.

It is another object of this invention to provide a fluid system in which a multi-pressure relief valve assembly therein automatically cancels a change in relief pressure of the system if, for example, it is attempted to bleed high pressure from the high pressure circuit into the low pressure circuit as by throttling of the directional control valves.

It is another object of this invention to provide a fluid system and relief valve assembly therefor which is capable of providing more than two different relief pressures for the system.

It is another object of this invention to provide a novel form of relief valve assembly which has a spring-biased relief valve member adapted to close and open fluid communication between the pressure inlet and tank ports of a directional control valve, said assembly having control ports adapted to be connected in the system so that when a fluid pressure actuated member in the relief valve assembly is actuated by fluid pressure in one control port it changes the relief pressure in the inlet port at which the relief valve member is unseated and when said fluid pressure actuated member is actuated by fluid pressure in another control port it cancels or further changes the relief pressure in the inlet port.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principle of the invention may be employed.

In said annexed drawings:

FIG. 3 is an enlarged cross-section view of the multi-pressure relief valve assembly which is employed as a component of the FIG. 1 fluid system, the same being adapted for mounting in the housing of the directional control valve;

FIG. 4 illustrates a directional control valve for parallel operation whereas the directional control valve shown in FIG. 1 is arranged for series-parallel operation; and FIG. 5 is a cross-section view similar to FIG. 3 except showing a three-pressure relief valve assembly, whereby fluid motors, as in FIG. 1, may be operated at three different pressures.

Figure 1:
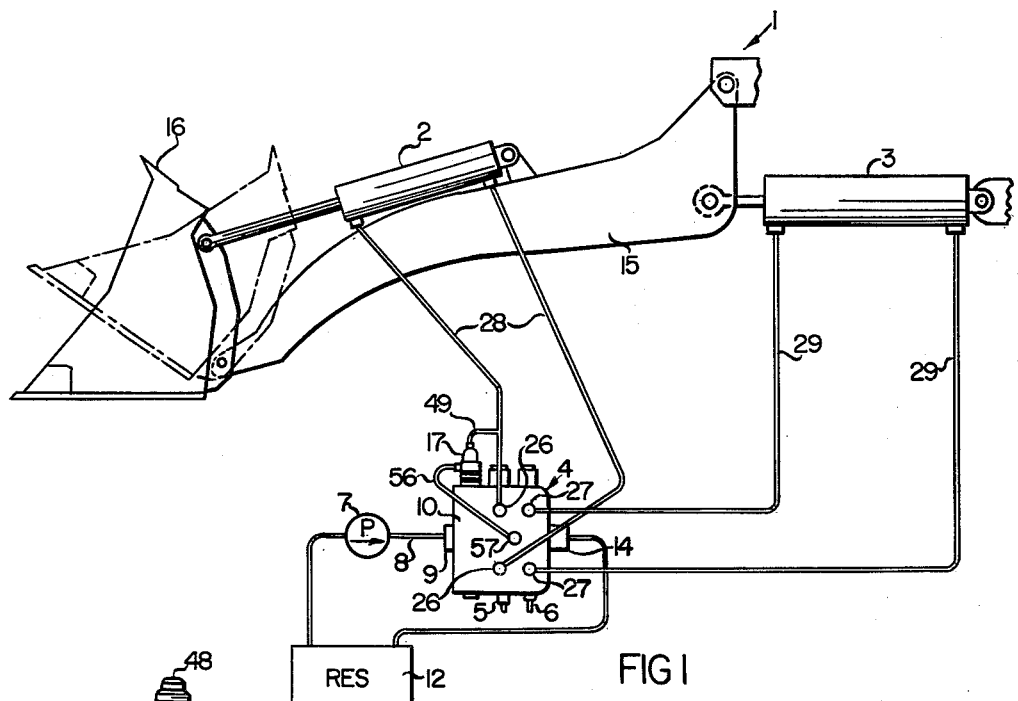
FIG. 1 is a diagrammatic view of a fluid system for a front end loader according to the present invention.

Referring now more particularly to the drawings, and first to FIG. 1, there is illustrated therein a fluid power system for actuating the components of a front end loader 1 or the like, including a bucket tilt motor 2 and a boom lift motor 3. For controlling the actuation of the respective motors 2 and 3 there is provided a two-spool directional control valve 4, and, in this case, since both motors 2 and 3 are of the double-acting type, each spool 5 and 6 is of the double-acting type.

The system illustrated in FIG. 1 includes the usual pump 7 which has its discharge port connected by conduit 8 to the inlet port 9 of the directional control valve housing 10. The fluid which passes through the bypass 11 (see FIG. 2) of the valve housing 10 or displaced by the fluid motors 2 or 3, as the case may be, is returned to the reservoir 12 by way of the return port 14 in the housing 10.

In an installation such as depicted in FIG. 1, the load on the boom lift motor is a predetermined maximum determined by the weights of the boom 15 and bucket 16 and the capacity of the bucket 16. To insure long life of the packings, the pump 7, the directional control valve 4, and other components of the system, it is desired to maintain the pressure in the boom lift circuit at a desired minimum which is sufficient to lift the boom 15 with a fully loaded bucket 16. Accordingly, the relief valve assembly 17, insofar as the operation of the boom lift motor 3 is concerned, should be set to open at that predetermined minimum pressure to avoid subjecting of the boom circuit components to excess pressure and to avoid overheating of the oil.

However, with reference to the bucket tilt motor 2, it is desired to employ a motor of minimum size, since, in general operation, only modest forces are required to tilt the bucket 16 for retaining a load therein and for dumping the load, but occasionally, as in digging operations, the initial roll-back or tilt of the bucket may be difficult and require application of much greater forces than could otherwise be obtained at the normal setting of the relief valve assembly 17.

It is for the foregoing purpose of enabling the application of greater than normal forces for the roll back of the bucket 16 that the present invention has been devised. Herein the relief valve assembly 17 is operative automatically to increase the available pressure for bucket roll-back when the directional control valve spool 5 for the bucket tilt motor 2 is shifted to a position effecting a tilt-back of the bucket 16.

Figure 2:
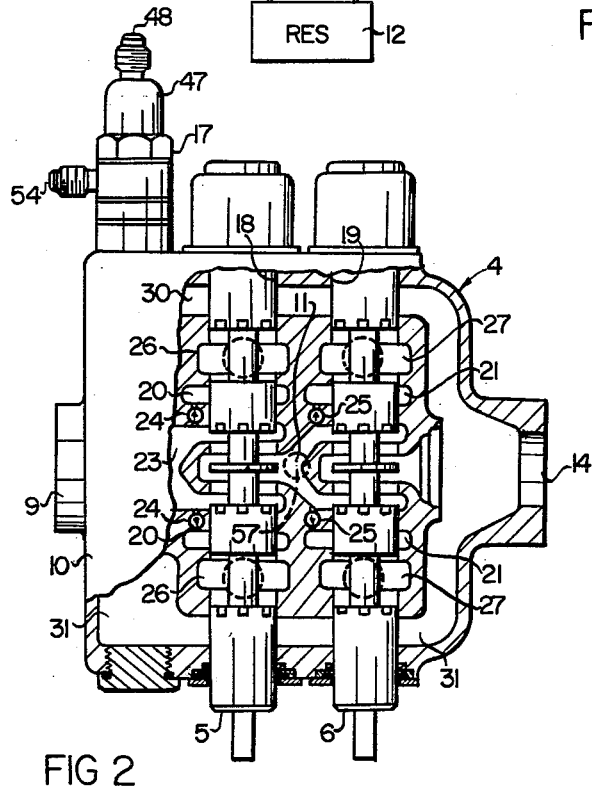
FIG. 2 is a cross-section view of the two-spool directional control valve (series-parallel type) for controlling the bucket and boom cylinders of the fluid system of FIG. 1.

In detail, the directional control valve assembly 4 in FIG. 2 has parallel bores 18 and 19 in which the respective spools 5 and 6 are axially slidable. Commencing at the middle of the lengths of the spool bores they are intersected by: (1) a common bypass passage 11 which communicates the inlet port 9 with the return port 14 when both spools 5 and 6 are in neutral position as shown in FIG. 2; (2) pairs of pressure feed passages 20, 20 and 21, 21 straddling the bypass passage 11 which respectively communicate with the main inlet chamber 23 by way of the check valves 24 and with a portion of the bypass passage 11 by way of the check valves 25; (3) motor ports 26, 26 and 27, 27 straddling the respective pressure feed passages 20, 20 and 21, 21, the motor ports 26 and 27 being connected by means of conduits 28 and 29 to the respective bucket tilt and boom lift motors 2 and 3; and (4) return passages 30, 31 straddling the respective motor ports 26 and 27 for conducting fluid displaced by the motors 2 and 3 to the return port 14.

Each spool 5 and 6 as aforesaid, is herein shown as being of the double-acting type, but, obviously, single acting or other types may be employed. Each spool 5 and 6 is spring-centered in neutral position and is formed with alternate lands and grooves for controlling actuation of the respective fluid motors 2 and 3. In FIG. 2 both spools are shown in neutral position whereby fluid delivered by the pump 7 is returned to the reservoir 12 by way of the then open bypass passage 11 which leads from the main inlet chamber 23 to the return port 14. When the spool 5 is shifted either upwardly or downwardly from neutral position, fluid under pressure will be conducted through one check valve 24, one pressure feed passage 20, and one motor port 26 to one end of the bucket tilt motor 2, and the fluid displaced by the motor 2 will be conducted to the reservoir 12 by way of the other motor port 26, the adjacent return passage 30 or 31 and the return port 14. In this particular case, which is a series-parallel arrangement, the operation of the spool 5 precludes operation of the boom lift motor 3 at that time since no fluid under pressure is admitted into the bypass passage 11.

When the other spool 6 is shifted either upwardly or downwardly from neutral position (while the spool 5 is in neutral position) to operate the boom lift motor 3, the bypass 11 to return port 14 is closed and fluid under pressure is conducted to one end of motor 3 from one motor port 27 which is in communication with a pressure feed passage 21 and its check valve 25 which permits flow of fluid from the bypass passage 11 and the main inlet chamber 23. At that time the fluid displaced from the other end of the motor 3 passes through the other motor port 27 to the return passage 30 or 31.

Installed in the housing 10 is a relief valve assembly 17 having a relief passage 35 in tubular seat member 36 which, when open establishes fluid communication between inlet chamber 23 and relief passage 31. Normally closing the relief passage 35 is a main relief valve member 37 which is urged against seat 38 by a spring 39. The main relief valve member 37 defines with the housing 10 a pressure seating chamber 40 to which fluid under pressure in the main inlet chamber 23 has access by way of the orifice 41. Closing the upper end of the seating chamber 40 is a pilot valve member 42 which is seated against the seat member 43 by means of the compression spring 45, which is backed up by a fluid pressure actuated plunger assembly 46 to change the spring bias on the pilot valve member 42 as hereinafter explained in detail.

In FIG. 3 the relief valve assembly is shown at the lower pressure setting, whereby, when the pressure in the main inlet chamber 23 and in the pressure seating chamber 40 reaches a value sufficient to move the pilot valve member 42 away from seat member 43, the chamber 40 is vented more rapidly than fluid can pass thereinto through the orifice 41. Thus, a pressure differential is created between the main inlet chamber 23 and the seating chamber 40 so that the main valve member 37 will move away from its seat 38 to relieve the pressure in the main inlet chamber 23 via the relief passage 35.

To provide for a greater relief pressure, the relief valve cap 47 is provided with a control port 48 which is connected by means of the conduit 49 to the bucket tilt-back motor circuit, the conduit 49 herein, for purposes of illustration, being shown connected directly to the conduit 28 which leads from the motor port 26 to the rod end of the bucket tilt motor 2, it being understood that the conduit 49 may be connected to a control port (not shown) formed in the housing 10 in the region of the upper motor port 26. Moreover, in lieu of employing a conduit 49, the housing may be cored to provide a passage leading from the motor port 26 to the chamber 50 of the relief valve assembly 17. In any event, when that motor port 26 is placed in fluid communication with the adjacent pressure feed passage 20, the pressure in that motor port circuit will act on the area A of the plunger 51 to move the spring backup member 52 toward the pilot valve member 42 until the plunger 51 engages the stop 53, and thus the spring bias on the pilot valve member 42 is increased so that a higher pressure in the main inlet chamber 23 and in the seating chamber 40 will be required before the pilot valve 42 will be unseated to permit unseating of the main relief valve member 37.

In most cases, spools such as 5 and 6 herein are formed with appropriate metering slots for regulating flow and to permit feathering or fine control of the respective motors 2 and 3. To preclude the possibility of conducting the higher pressure fluid to the lower pressure circuit where it is not desired, the relief valve assembly 17 is provided with a second control port 54 which communicates by way of the conduit 56 and port 57 with the bypass passage 11 which is the pressure inlet chamber for the spool 6 when the latter is in an operating position. Thus, if, at the time that high pressure is being supplied to the bucket tilt motor 2, it is attempted to conduct high pressure for the boom lift motor 3 by feathering control, the presence of fluid under pressure in the bypass passage 11 will be conducted by conduit 56 to the second control port 54 and this will react against the annular area B of the plunger 51 to overcome the effect of the pressure on the smaller area A. In this way, the plunger 51 is forced up against the stop 58 to cancel the increased bias on the pilot valve spring 45.

For parallel operation, as shown in FIG. 4, the feed passages 60, 60 for the downstream spool 6 are connected with the main inlet chamber 23. In this way, the spools 5 and 6 may be operated independently, or simultaneously. The second control port 54 of the relief valve assembly 17 is connected by conduit 61 to the motor ports 27 of the spool 6 so as to cancel the spring 45 bias increase when both spools 5 and 6 are at the same time in operating position. In other words, the high pressure of say, 2200 p.s.i. is available for actuating the bucket motor 2 for tilt-back only when its spool 5 is operated by itself and the boom motor 3 circuit will have only a lower pressure of say 1600 p.s.i. available when its spool 6 is operated by itself or at the same time that the bucket spool 5 is in operating position.

In FIG. 5 is shown a relief valve assembly 70 for a fluid circuit which provides for three different pressure settings of the pressure in the main inlet chamber 23 according to how the spools 5 and 6 are connected with the first and second control ports 48 and 54. When there is no pressure in either of the two control ports 48 and 54, the opening pressure of the main relief valve member 37 is controlled by the bias of the spring 45 on the pilot valve member 42. When there is pressure in the control port 54, the plunger 71 is urged against the stop 72 to force the spring backup member 73 toward the pilot valve member 42 to predeterminedly increase the spring 45 bias thus to provide a second setting at higher pressure than the initial setting aforesaid. Finally, when there is pressure in the control port 48, it acts on the other plunger 74 to urge it against the stop 75 to further move the spring backup member 73 toward the pilot valve member 42 thus to provide a third and yet higher relief pressure setting. By way of example, the control ports 54 and 48 of FIG. 5 may be connected with either pair of the two pairs of motor ports 26, 26 or 27, 27, or may be connected to one motor port 26 or 27 of each pair, or may be connected as in FIG. 1 to provide for lowest pressure operation in one position of the bucket spool 5, intermediate pressure operation of the boom spool 6 and the highest pressure operation for the other position of the bucket spool for the bucket roll-back operation.

Other modes of applying the principle of the invention may be employed, change being made as regards the details described, provided the features stated in any of the following claims, or the equivalent of such, be employed.

I therefore particularly point out and distinctly claim as my invention:

1. In combination, at least two directional control valves for controlling the actuation of corresponding fluid motors, each valve having an inlet port for fluid under pressure, a motor port for connection with the corresponding motor, and a movable valve member selectively operable to block and to open fluid communication between said inlet port and motor port; a relief valve having a relief port in fluid communication with one inlet port, and a pair of control ports respectively having fluid communication with one motor port and with the other inlet port; said relief valve comprising a movable relief valve member, spring means biasing said relief valve member to a position closing said relief port, and a fluid pressure actuated member bearing on said spring means and exposed to fluid under pressure in said control ports and movable thereby to change the spring bias on said relief valve member or to substantially cancel such change according to which one of said control ports is exposed to fluid under pressure.

2. The combination of claim 1 wherein the control port having fluid communication with said one motor port is effective, when said one motor port is in fluid communication with its associated inlet port, to increase the spring bias on said relief valve member whereby the fluid motor associated with said one motor port may be operated at greater fluid pressure than the motor associated with the other motor port.

3. The combination of claim 1 wherein said relief valve is of the pilot-operated type in which said relief valve member has opposite sides thereof exposed to fluid under pressure in said one inlet port and in which a pilot valve member is spring biased as aforesaid to vent one side of said relief valve member for opening thereof as such different fluid pressures.

4. The combination of claim 1 wherein the directional control valve which has said one motor port has another motor port for connection with the other port of a double-acting fluid motor whereby the latter will be actuated at different pressures according to whether said one motor port or said another motor port is in fluid communication with said one inlet port.

5. The combination of claim 1 wherein the directional control valve which has said one motor port is upstream of the other directional control valve.

6. In combination, a double-acting fluid motor; a pump for delivering fluid under pressure to said motor; a directional control valve comprising a housing having an inlet port connected to said pump, a pair of motor ports connected to opposite ends of said motor, and an exhaust port, and a valve member movable in said housing from a position blocking fluid communication between said inlet port and both motor ports to positions selectively communicating said inlet port with either motor port and said exhaust port with the other motor port; a relief valve having a relief port leading from said inlet port to said exhaust port, and a control port in fluid communication with one motor port; said relief valve comprising a relief valve member movable to open and close said relief port, spring means biasing said relief valve member to closed position, and a fluid pressure actuated member bearing on said spring means and exposed to fluid under pressure in said control port for movement thereby to change the spring bias on said relief valve member when said valve member is moved to a position communicating said inlet port with said one motor port.

7. The combination of claim 6 wherein fluid pressure in said one motor port is effective, through said control port to move said fluid pressure actuated member in a direction to increase the spring bias on said relief valve member to provide a higher relief pressure than when there is fluid pressure in the other motor port.

8. The combination of claim 6 wherein said relief valve has a second control port for connection with another directional control valve and to which said fluid pressure actuated member is exposed to substantially cancel such change in relief pressure when fluid under pressure is conducted to said second control port.

9. In combination, a pump; a control valve assembly having an inlet port and at least two outlet ports; a relief valve; and conduits interconnecting said pump and control valve assembly whereby fluid under pressure is delivered by said pump to said inlet port and is selectively conducted to said outlet ports by actuation of said control valve assembly; said relief valve having a relief port communicating with said inlet port and a control port exposed to fluid under pressure in one outlet port; said relief valve comprising a relief valve member movable to open and close said relief port, spring means biasing said relief valve member to closed position, and a fluid pressure actuated member bearing on said spring means and exposed to fluid under pressure in said control port and movable thereby to change the spring bias on said relief valve member whereby different relief pressures are automatically provided when the respective outlet ports are communicated with said inlet port by actuation of said control valve assembly.

10. The combination of claim 9 wherein said fluid pressure actuated member, when exposed to fluid pressure in said control port, is moved in a direction to increase the spring bias on said relief valve member.

11. The combination of claim 9 wherein said relief valve has another control port to which said fluid pressure actuated member is exposed for further changing the spring bias on said relief valve member.

12. The combination of claim 9 wherein said relief valve has another control port; said fluid pressure actuated member comprising first and second plungers exposed to fluid under pressure in the respective control ports.

13. The combination of claim 12 wherein fluid under pressure acting on said first plunger increases the spring bias on said relief valve member, and wherein fluid under pressure in said another control port acting on said second plunger decreases the spring bias on said relief valve member.

14. The combination of claim 12 wherein fluid under pressure acting on one plunger increases the spring bias on said relief valve member, and wherein fluid under pressure acting on the other plunger further increases the spring bias on said relief valve member whereby three relief pressures are provided viz, one according to the spring bias without fluid under pressure in either control port, and two and three according to the spring bias with fluid under pressure in the respective control ports.

15. In combination, at least two directional control valves for controlling the actuation of corresponding fluid motors, each valve having an inlet port for fluid under pressure, a motor port for connection with the corresponding motor, and a movable valve member selectively operable to block and to open fluid communication between said inlet port and motor port; a relief valve having a relief port in fluid communication with one inlet port, and a pair of control ports respectively having fluid communication with one motor port and with the other inlet port; said relief valve comprising a movable relief valve member, spring means biasing said relief valve member to a position closing said relief port, and a fluid pressure actuated member bearing on said spring means and exposed to fluid under pressure in said control ports and movable thereby either to change the spring bias on said relief valve member or to substantially cancel such change according to which one of said control ports is exposed to fluid under pressure; said fluid pressure actuated member comprising first and second plunger portions exposed to fluid under pressure in the respective control ports.

16. The combination of claim 15 wherein said plunger portions have different fluid pressure exposed areas.

References Cited in the file of this patent
UNITED STATES PATENTS

| | | |
|---|---|---|
| 2,573,563 | Gardiner | Oct. 30, 1951 |
| 2,988,891 | Hemings | June 20, 1961 |
| 3,023,584 | Markovich | Mar. 6, 1962 |